(12) United States Patent
Vdovin et al.

(10) Patent No.: US 10,234,690 B2
(45) Date of Patent: Mar. 19, 2019

(54) AUTOSTEREOSCOPIC DISPLAY DEVICE

(71) Applicant: KONINKLIJKE PHILIPS N.V., Eindhoven (NL)

(72) Inventors: Olexandr Valentynovych Vdovin, Eindhoven (NL); Bart Kroon, Eindohven (NL); Mark Thomas Johnson, Arendonk (BE); Eibert Gerjan Van Putten, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 35 days.

(21) Appl. No.: 15/529,664

(22) PCT Filed: Dec. 18, 2015

(86) PCT No.: PCT/EP2015/080383
§ 371 (c)(1),
(2) Date: Aug. 10, 2017

(87) PCT Pub. No.: WO2016/102338
PCT Pub. Date: Jun. 30, 2016

(65) Prior Publication Data
US 2018/0011332 A1 Jan. 11, 2018

(30) Foreign Application Priority Data
Dec. 24, 2014 (EP) .................... 14200328

(51) Int. Cl.
*H04N 13/00* (2018.01)
*H04N 9/47* (2006.01)
(Continued)

(52) U.S. Cl.
CPC ....... *G02B 27/2214* (2013.01); *H04N 5/2628* (2013.01); *H04N 13/307* (2018.05);
(Continued)

(58) Field of Classification Search
USPC ...................................................... 348/42, 59
See application file for complete search history.

(56) References Cited

U.S. PATENT DOCUMENTS 8,416,289 B2 4/2013 Akeley
8,638,402 B2 1/2014 Sakamoto et al.
(Continued)

OTHER PUBLICATIONS

Saveljev et al "Reference Functions for Synthesis and Analysis of Multiview and Integral Images" Journal of the Optical Society of Korea, vol. 17, No. 2, Apr. 2013 p. 148-161.
(Continued)

*Primary Examiner* — Nigar Chowdhury

(57) ABSTRACT

An autostereoscopic display comprises a pixelated display panel comprising an array of single color pixels or an array of sub-pixels of different colors and a view forming arrangement comprising an array of lens elements. The pixels form a square (or near square) grid, and the lenses also repeat in a square (or near square) grid. A vector p is defined which relates to a mapping between the pixel grid and the lens grid. Regions in the two dimension space for this vector p are identified which give good or poor banding performance, and the better banding performance regions are selected.

15 Claims, 11 Drawing Sheets

(51) Int. Cl.
*G02B 27/22* (2018.01)
*H04N 5/262* (2006.01)
*H04N 13/324* (2018.01)
*H04N 13/317* (2018.01)
*H04N 13/307* (2018.01)
*H04N 13/351* (2018.01)

(52) U.S. Cl.
CPC ......... *H04N 13/317* (2018.05); *H04N 13/324* (2018.05); *H04N 13/351* (2018.05)

(56) References Cited

U.S. PATENT DOCUMENTS

| | | |
|---|---|---|
| 8,817,082 B2 | 8/2014 | Van Der Horst et al. |
| 9,451,243 B2 | 9/2016 | Kroon et al. |
| 9,560,341 B2* | 1/2017 | Nakamura ................ G06F 3/14 |
| 2005/0195293 A1 | 9/2005 | Koyayashi et al. |
| 2006/0195293 A1 | 8/2006 | Koike et al. |
| 2009/0128620 A1* | 5/2009 | Lipton ................ H04N 19/597 |
| | | 348/42 |
| 2011/0075256 A1 | 3/2011 | De Zwart et al. |
| 2013/0182319 A1 | 7/2013 | Chung |
| 2013/0208356 A1 | 8/2013 | Saito |
| 2014/0002897 A1 | 1/2014 | Krijn et al. |
| 2015/0358595 A1* | 12/2015 | Sandrew ................ H04N 9/79 |
| | | 386/282 |

OTHER PUBLICATIONS

"High-quality integral videography using a Multiprojector" Hongen Liao, Makoto Iwahara, Nobuhiko Hata, and Takeyoshi Dohi Graduate School of Information Science and Technology, the University of Tokyo;2004.

* cited by examiner

AUTOSTEREOSCOPIC DISPLAY DEVICE

CROSS-REFERENCE TO PRIOR APPLICATIONS

This application is the U.S. National Phase application under 35 U.S.C. § 371 of International Application No. PCT/EP2015/080383, filed on Dec. 18, 2015, which claims the benefit of EP Patent Application No. EP 14200328.4, filed on Dec. 24, 2014. These applications are hereby incorporated by reference herein.

FIELD OF THE INVENTION

This invention relates to an autostereoscopic display device and a driving method for such a display device.

BACKGROUND OF THE INVENTION

A known autostereoscopic display device comprises a two-dimensional liquid crystal display panel having a row and column array of display pixels (wherein a "pixel" typically comprises a set of "sub-pixels", and a "sub-pixel" is the smallest individually addressable, single-color, picture element) acting as an image forming means to produce a display. An array of elongated lenses extending parallel to one another overlies the display pixel array and acts as a view forming means. These are known as "lenticular lenses". Outputs from the display pixels are projected through these lenticular lenses, whose function is to modify the directions of the outputs.

The pixel comprises the smallest set of sub-pixels which can be addressed to produce all possible colors. For the purposes of this description, a "unit cell" is also defined. The unit cell is defined as the smallest set of sub-pixels which repeat to form the full sub-pixel pattern. The unit cell may be the same arrangement of sub-pixels as a pixel. However, the unit cell may include more sub-pixels than a pixel. This is the case if there are pixels with different orientations of sub-pixels, for example. The overall sub-pixel pattern then repeats with a larger basic unit (the unit cell) than a pixel.

The lenticular lenses are provided as a sheet of lens elements, each of which comprises an elongate partially-cylindrical (e.g. semi-cylindrical) lens element. The lenticular lenses extend in the column direction of the display panel, with each lenticular lens overlying a respective group of two or more adjacent columns of display sub-pixels.

Each lenticular lens can be associated with two columns of display sub-pixels to enable a user to observe a single stereoscopic image. Instead, each lenticular lens can be associated with a group of three or more adjacent display sub-pixels in the row direction. Corresponding columns of display sub-pixels in each group are arranged appropriately to provide a vertical slice from a respective two dimensional sub-image. As a user's head is moved from left to right a series of successive, different, stereoscopic views are observed creating, for example, a look-around impression.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of rows and columns of display sub-pixels 5. For the sake of clarity, only a small number of display sub-pixels 5 are shown in the Figure. In practice, the display panel 3 might comprise about one thousand rows and several thousand columns of display sub-pixels 5. In a black and white display panel a sub-pixel in fact constitutes a full pixel. In a color display a sub-pixel is one color component of a full color pixel. The full color pixel, according to general terminology comprises all sub-pixels necessary for creating all colors of a smallest image part displayed. Thus, e.g. a full color pixel may have red (R) green (G) and blue (B) sub-pixels possibly augmented with a white sub-pixel or with one or more other elementary colored sub-pixels. The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display sub-pixel 5 comprises opposing electrodes on the substrates, with the intervening liquid crystal material there between. The shape and layout of the display sub-pixels 5 are determined by the shape and layout of the electrodes. The display sub-pixels 5 are regularly spaced from one another by gaps.

Each display sub-pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display sub-pixels 5 being driven to modulate the light and produce the display.

The display device 1 also comprises a lenticular sheet 9, arranged over the display side of the display panel 3, which performs a light directing function and thus a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses each having an elongate axis 12 extending perpendicular to the cylindrical curvature of the element, and each element acts as a light output directing means to provide different images, or views, from the display panel 3 to the eyes of a user positioned in front of the display device 1.

The display device has a controller 13 which controls the backlight and the display panel.

The autostereoscopic display device 1 shown in FIG. 1 is capable of providing several different perspective views in different directions, i.e. it is able to direct the pixel output to different spatial positions within the field of view of the display device. In particular, each lenticular element 11 overlies a small group of display sub-pixels 5 in each row, where, in the current example, a row extends perpendicular to the elongate axis of the lenticular element 11. The lenticular element 11 projects the output of each display sub-pixel 5 of a group in a different direction, so as to form the several different views. As the user's head moves from left to right, his/her eyes will receive different ones of the several views, in turn.

The skilled person will appreciate that a light polarizing means must be used in conjunction with the above described array, since the liquid crystal material is birefringent, with the refractive index switching only applying to light of a particular polarization. The light polarizing means may be provided as part of the display panel or the view forming arrangement of the device.

FIG. 2 shows the principle of operation of a lenticular type view forming arrangement as described above and shows the light source 7, display panel 3 and the lenticular sheet 9. The arrangement provides three views each projected in different directions. Each sub-pixel of the display panel 3 is driven with information for one specific view.

In the designs above, the backlight generates a static output, and all view direction is carried out by the lenticular arrangement, which provides a spatial multiplexing approach. A similar approach is achieved using a parallax barrier.

The lenticular arrangement only provides an autostereoscopic effect with one particular orientation of the display. However, many hand held devices are rotatable between portrait and landscape viewing modes. Thus, a fixed lenticular arrangement does not allow an autostereoscopic viewing effect in different viewing modes. Future 3D displays, especially for tablets, mobile phones and other portable devices will thus have a possibility to observe 3D images from many directions and for different screen orientations. Modern LCD and OLED display panels with existing pixel designs are not suited for this application. This issue has been recognized, and there are various solutions.

A dynamic solution involves providing a switchable lens arrangement, which can be switched between different modes to activate the view forming effect in different orientations. There may essentially be two lenticular arrangements, with one acting in pass through mode and the other acting in lensing mode. The mode for each lenticular arrangement may be controlled by switching the lenticular arrangement itself (for example using an LC switchable lens array) or by controlling a polarization of the light incident on the lenticular arrangement.

A static solution involves designing a lens arrangement which functions in the different orientations. A simple example can combine a rectangular grid of square sub-pixels in the display with a rectangular grid of microlenses (where the lens grid directions are either slanted or non-slanted with respect to the pixel grid directions) to create multiple views in both display orientations. The sub-pixel shapes should be preferably close to a 1:1 aspect ratio, as this will allow avoiding a problem of different angular width for individual views in portrait/landscape orientations.

One possible disadvantage of this approach is a banding effect, in which the black matrix areas between the sub-pixels are projected to the viewer as a regular pattern. Partially it can be solved by slanting the lens array. Specifically, in order to reduce banding effect due to projection of periodic black pixel matrix a view forming arrangement need to be chosen with respect to the pixel addressing direction (rows/columns).

SUMMARY OF THE INVENTION

The invention is defined by the claims.

According to an example, there is provided an autostereoscopic display, comprising:

a pixelated display panel comprising an array of single color pixels or an array of sub-pixels of different colors with respective groups of sub-pixels together defining full color pixels; and a view forming arrangement comprising an array of lens elements, positioned over the display panel, for directing the light from different pixels or sub-pixels to different spatial locations, thereby to enable different views of a three dimensional scene to be displayed in different spatial locations, wherein the pixels of the display panel form a rectangular or parallelogram grid with a maximum internal angle deviation from 90 degrees of 20 degrees or less, and wherein the rectangular or parallelogram grid repeats with basic translation vectors x and y, and the length of the basic translation vectors x and y have an aspect ratio of the shorter to the longer between 0.66 and 1, and wherein the view forming arrangement comprises a two dimensional array of microlenses which repeat in a regular grid with basic translation vectors p' and q';

wherein defining a dimensionless vector p as $(p_x, p_y)$, which satisfies:

$$p' = p_x x + p_y y$$

$$q' = -p_y x + p_x y$$

and defining circular regions in the space of components $p_y$ and $p_x$ of vector p as:

$$P_{n,m} = \{p \mid \|p - v\| < r_{n,m} \forall v \in \mathcal{L}_{n,m}\} \text{ where}$$

$$\mathcal{L}_{n,m} = \left\{ i + \frac{j}{n} \mid i, j \in \mathbb{Z}^2 \wedge \langle j, j \rangle = m \right\}$$

for integer values n and m, with $r_{n,m} = r_0 n^{-\gamma}$ defining the radius of each circle and $\mathcal{L}_{n,m}$ defining the circle centers, the basic translation vectors x, y, p' and q' are selected with values such that p falls in the the vector space which excludes the set $P_{1,1}$ or $P_{2,2}$ or $P_{4,4}$ with $r_0 = 0.1$ and $\gamma = 0.75$.

In words, the main equation above reads as follows:

(Line 1) $P_{n,m}$ is equal to the set of values of p such that the modulus (i.e. length) of the difference vector from a vector v to the vector p is less than $r_{n,m}$ for all values of vector v in the set $\mathcal{L}_{n,m}$. This defines the circles centered on the set of values $\mathcal{L}_{n,m}$.

(Line 2) $\mathcal{L}_{n,m}$ is the set of vector values i+j/n with i and j as vectors in the two dimensional vector space of integer values (i.e. positive and negative integers and zero) and for which the vector inner product function applied to the j vector gives the answer m. The vector inner product function is, for $i = [i\ j]^T$ then $\langle i, i \rangle = i^2 + j^2$.

The vector p defines the spatial relationship between the pixel (or sub-pixel) grid and the grid of lenses. Thus, it defines a mapping between the pixels (or sub-pixels) and the lenses. In particular, the components of the vector p are the terms of the matrix transformation from the pixel grid vector space (defined by x and y) and the lens grid vector space (defined by p' and q'). Note that the term "pixel grid" is used to indicate the grid of pixels (if each pixel has only one addressable element), or the grid of sub-pixels (if each pixel has multiple independently addressable sub-pixels). The components of the vector p in turn define how different pixels (or sub-pixels) contribute to different lens phases and how the black mask area is imaged by the grid of lenses. Thus, the vector p can be considered to be a most fundamental way to define the relationship between the lenses and the pixels.

By "basic translation vector" is meant a vector translation from one point within a pixel or lens area to a corresponding point in an adjacent pixel or lens area. The lens and pixel areas are two dimensional, so there are two translation vectors—one for each grid direction. For a rectangular grid, the basic translation vectors are in the orthogonal row and column directions. For a skewed grid, the basic translation vectors are not orthogonal, but follow the row and column directions of the grid.

The circular regions define sets of possible values for the components of the vector p and thus define regions of related characteristics. By excluding the regions defined as $P_{1,1}$ banding problems are prevented.

For example, the center of the $P_{1,1}$ region includes the values of p which result from monochrome panels with integer relationship between the pixel grid and lens grid. Other routine panel designs, for example with an integer array of sub-pixels under each lens, as well as fractional designs, correspond to values of p which fall in the center of the $P_{1,1}$, $P_{2,2}$ or $P_{4,4}$ regions.

In this way, the invention provides design parameters for display panel layouts that solves the banding problems mentioned above and enables rotatable multi-view autostereoscopic 3D displays with good performance.

The basic translation vectors x, y, p' and q' may have values such that p is not in the set $P_{1,1}$ with $r_0=0.25$ and $\gamma=0.75$.

The basic translation vectors x, y, p' and q' may have values such that p is not in the set $P_{2,2}$ with $r_0=0.25$ and $\gamma=0.75$.

The basic translation vectors x, y, p' and q' may have values such that p is not in the set $P_{4,4}$ with $r_0=0.25$ and $\gamma=0.75$.

The basic translation vectors x, y, p' and q' may have values such that p is not in the set $P_{5,5}$ with $r_0=0.25$ and $\gamma=0.75$.

The basic translation vectors x, y, p' and q' may have values such that p is not in the set $P_{8,8}$ with $r_0=0.25$ and $\gamma=0.75$.

These different regions represent progressively better banding performance, such that by excluding progressively more areas in the design space for the vector p, the remaining design options give progressively better banding performance.

The basic translation vectors x, y, p' and q' may have values such that p is not in the sets as defined above with $r_0=0.35$. This defines a larger radius of each excluded zone, hence a smaller remaining design space.

There are also preferred regions in the vector space for the vector p. In one example, the basic translation vectors x, y, p' and q' have values such that p is in the set $P_{9,18}$ with $r_0=0.35$ and $\gamma=0.75$.

In another example, the basic translation vectors x, y, p' and q' have values such that p is in the set $P_{14,26}$ with $r_0=0.35$ and $\gamma=0.75$.

As mentioned above, the pixel grid is preferably near square. For example, the rectangle or parallelogram may have an aspect ratio of the length of the shorter side to the longer side between 0.83 and 1. The rectangle or parallelogram may have a maximum internal angle deviation from 90 degrees of 5 degrees or less.

The display device may be used in a portable device, wherein the portable device is configurable to operate in a portrait display mode and a landscape display mode. It may be a mobile telephone or tablet.

BRIEF DESCRIPTION OF THE FIGURES

Embodiments of the invention will now be described, purely by way of example, with reference to the accompanying drawings, in which.

Note that FIGS. 3a-e and 4 are intended to show square pixel and lens grids, and that FIGS. 5 to 8 are intended to show circular regions. Any distortions from square and circular representations are the result of inaccurate image reproduction.

DETAILED DESCRIPTION OF THE EMBODIMENTS

The invention provides an autostereoscopic display, comprising a pixelated display panel comprising an array of single color pixels or an array of sub-pixels of different colors and a view forming arrangement comprising an array of lens elements. The pixels form a square (or near square) grid, and the lenses also repeat in a square (or near square) grid. A vector p is defined which relates to a mapping between the pixel grid and the lens grid. Regions in the two dimension space for this vector p are identified which give good or poor banding performance, and the better banding performance regions are selected.

In the description below, display panel designs are discussed with pixels on a regular 4-fold symmetric essentially square grid, on top of which there is a light modulator that also has elements in a regular 4-fold symmetric grid. For the purposes of explanation, some definitions are needed. In particular, a coordinate system of the panel (i.e. the pixel grid) needs to be defined, and a coordinate system of the view forming arrangement needs to be defined in terms of geometric (physical) coordinates and logical coordinates that are relative to the coordinate system of the panel.

Figure 1:
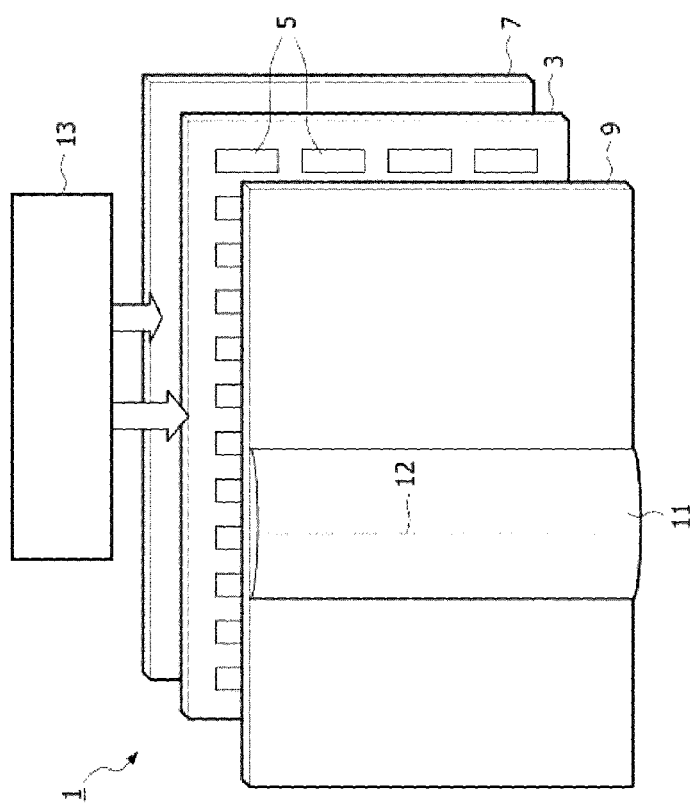
FIG. 1 is a schematic perspective view of a known autostereoscopic display device.
Figure 2:
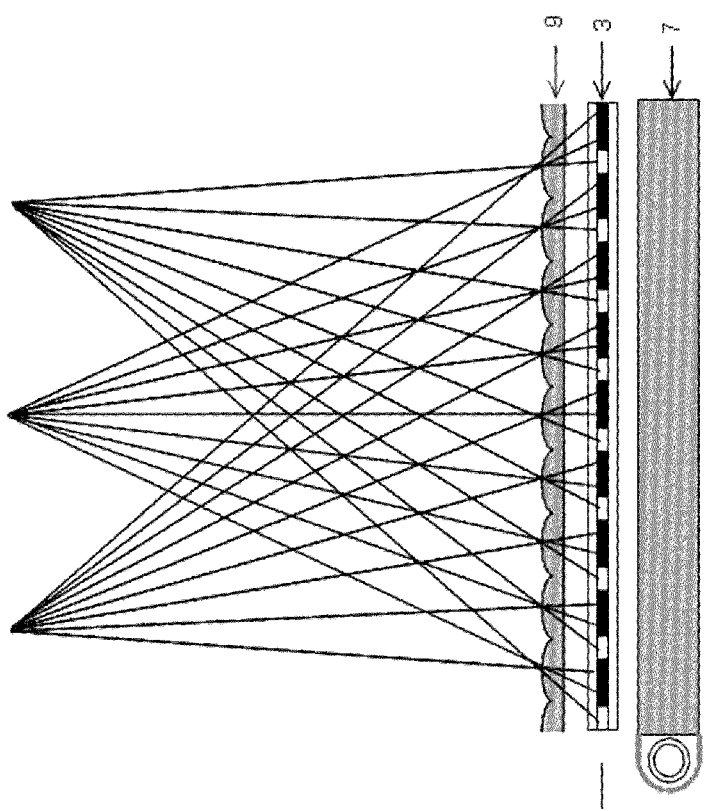
FIG. 2 is a schematic cross sectional view of the display device shown in FIG. 1.
Figure 3:
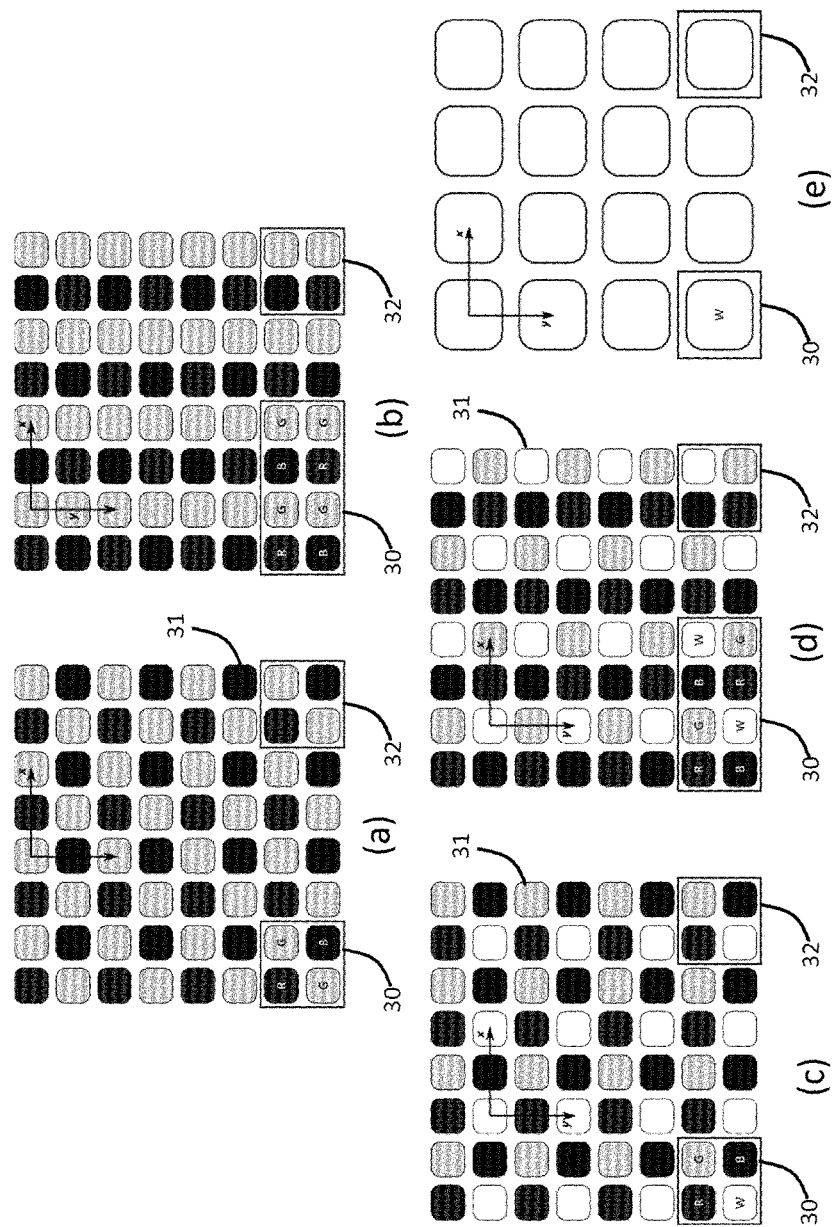
FIGS. 3a-e shows various possible pixel grids.

FIG. 3 shows various possible pixel grids. Each example shows the smallest unit cell 30 (i.e. the smallest set of sub-pixels 31 which repeat to form the sub-pixel pattern, as defined above) and a pixel 32 using the definition employed in this description. A pixel 32 is the smallest square arrangement of all of the primary colors so that the pixel size and shape is the same in the two orthogonal orientations.

The sub-pixels are shown as squares. However, the actual sub-pixel shape may be different. For example the actual pixel aperture will typically be an irregular shape as it may for example depend on the size and position of pixel circuit elements, such as the switching transistor in the case of an active matrix display panel. It is the pixel grid shape that is important rather than the precise shape of individual pixels or sub-pixels.

Pixel pitch vectors x and y are also shown. These are translation vectors between adjacent pixel centers in the row direction and the column direction, respectively. The letters in the smallest unit cell 30 indicate the primary colors: R=red, G=green, B=blue, W=white.

FIG. 3(a) shows an RGGB unit cell and an RGGB pixel, FIG. 3(b) shows an RGBGBGRG unit cell and an RGBG pixel, FIG. 3(c) shows an RGBW unit cell and an RGBW pixel, FIG. 3(d) shows an RGBWBWRG unit cell and an RGBW pixel, and FIG. 3(d) shows a W unit cell and a W pixel.

A pixel grid is defined based on the two vectors x and y, hereafter referred to as pixel pitch vectors. The vectors form a lattice matrix X=[x y] with length units (e.g. meters). There are multiple possible definitions of a pixel including the smallest unit cell, however for this description, the pixel is approximately square. Therefore X should be chosen to form an approximately square region of sub-pixels. As shown in FIGS. 3(a) to (d), for color displays, the pixel definition most simply results in a region with 2×2 sub-pixels. When the unit cell is larger, as in FIGS. 3(b) and (d), the pixel group appears rotated or mirrored to form the larger unit cell, but also in these cases X remains a 2×2 region. For monochrome displays the pixel is the region of a single sub-pixel.

The pixels do not need to be perfectly square. They may be approximately square, which is taken to mean that a rotation over any angle, a limited sheer or limited elongation is within scope. The aspect ratio is defined as:

$$a = \frac{|x|}{|y|}$$

and the angle of the grid is:

$$\theta = \cos^{-1} \frac{\langle x, y \rangle}{\sqrt{\langle x, x \rangle \langle y, y \rangle}}.$$

The sheer is then expressed as |θ−90°|. Hence for an approximately square grid it holds that a≈1 and |θ−90°|≈0°.

For example, a is preferably between 0.9 and 1.1 and θ is between 80 and 100 degrees (of course, if one pair of corner angles is at 80 degrees, then the other pair will be at 100 degrees).

To define the lens grid, lens pitch vectors can be defined.

Figure 4:
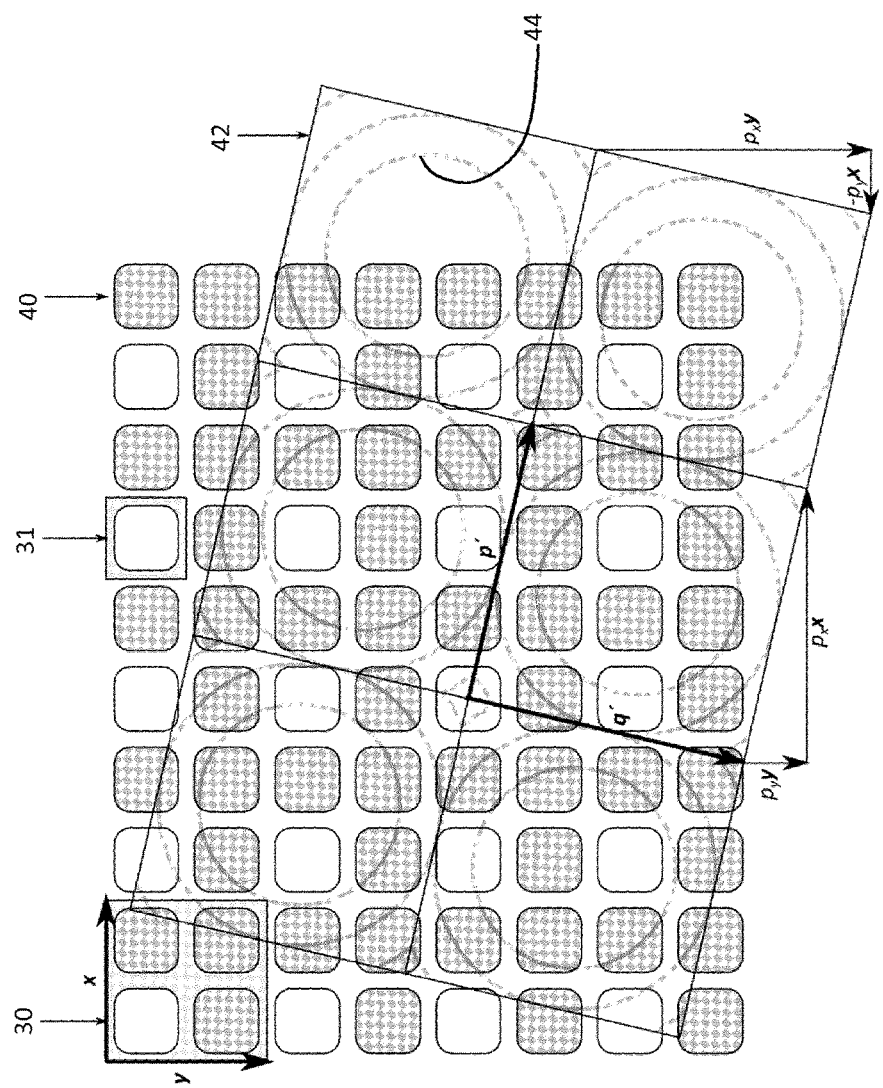
FIG. 4 shows a lens grid overlaid over a square pixel array, with a pitch vector p defining the relationship between them.

FIG. 4 shows a lens grid 42 overlaid over a square pixel array 40 with 2×2 sub-pixels 31 per pixel 32 (such as in FIGS. 3(a) and (c)). One out of each pixel group of four sub-pixels 31 is highlighted (i.e. shown white). The vectors x and y are the pixel pitch vectors of that grid as explained above. The lens grid 42 comprises a microlens array with spherical lenses 44 organized on a square grid. The vectors p' and q' are the pitch vectors of that grid. They are formed by a linear combination of the pixel pitch vectors.

Instead of physical lens pitch vectors in units of meters, logical and dimensionless lens pitch vectors can be defined as:

$p=(p_x,p_y)$ and $q=(-p_y,p_x)$ for chosen $p_x$ and $p_y$.

The geometric (physical) pitch vectors p' and q' (e.g. in meters) are defined in terms of the logical lens pitch vectors as:

$p'=Xp=p_x x+p_y y,$ $q'=Xq=p_y x+P_x y.$

Deformations in the pixel grid should be reflected in equal deformations of the lens grid. Notice that ⟨p,q⟩=0 but not necessarily ⟨p',q'⟩=0 as we do not require ⟨x,y⟩=0. Similarly |p|=|q| but not necessarily |p'|=|q'|.

For the purposes of this description, regions are defined $P_{n,m}$ for integer values n and m. These regions consist of multiple circles, themselves organized on a grid of circles. Such a region is defined by:

$$P_{n,m} = \{p \mid \|p - v\| < r_{n,m} \forall v \in \mathcal{L}_{n,m}\} \text{ where}$$

$$\mathcal{L}_{n,m} = \left\{ i + \frac{j}{n} \mid i, j \in \mathbb{Z}^2 \wedge \langle j, j \rangle = m \right\}.$$

The p−v term specifies the length of the vector from v top and thus the inequality defines a set of circles with a center defined by v. v is itself a set of vectors defined by the set of L terms. This has a discrete number of members as a result of the conditions placed on the integer values which make up the two dimensional vectors i and j.

Here $r_{n,m}=r_0 n^{-\gamma}$ is the radius of each circle. This radius thus decreases with increasing n. $\mathcal{L}_{n,m}$ defines the set of centers, and ⟨i, i⟩ denotes the inner product, such that when $i=[i\ j]^T$ then $\langle i, i\rangle = i^2+j^2$. We also define the shorthand $P_n=P_{n,n}$. Note that there are integers k for which there are no possible combinations of integers i and j for which ⟨j,j⟩=k holds. As a consequence, the $P_3$, $P_6$ and $P_7$ sets are empty.

As an example, the set $P_5$ can be explored starting with $\mathcal{L}_{5,5}$.

With $i \in \mathbb{Z}^2$ we indicate all $i=[i\ j]^T$ where i and j are integers (negative, zero or positive). The set of solutions to $j \in \mathbb{Z}^2 \wedge \langle j,j \rangle = 5$ is:

$$j \in \left\{ \begin{bmatrix} -2 \\ -1 \end{bmatrix}, \begin{bmatrix} -2 \\ 1 \end{bmatrix}, \begin{bmatrix} -1 \\ -2 \end{bmatrix}, \begin{bmatrix} -1 \\ 2 \end{bmatrix}, \begin{bmatrix} 1 \\ -2 \end{bmatrix}, \begin{bmatrix} 1 \\ 2 \end{bmatrix}, \begin{bmatrix} 2 \\ -1 \end{bmatrix}, \begin{bmatrix} 2 \\ 1 \end{bmatrix} \right\}.$$

Figure 5:
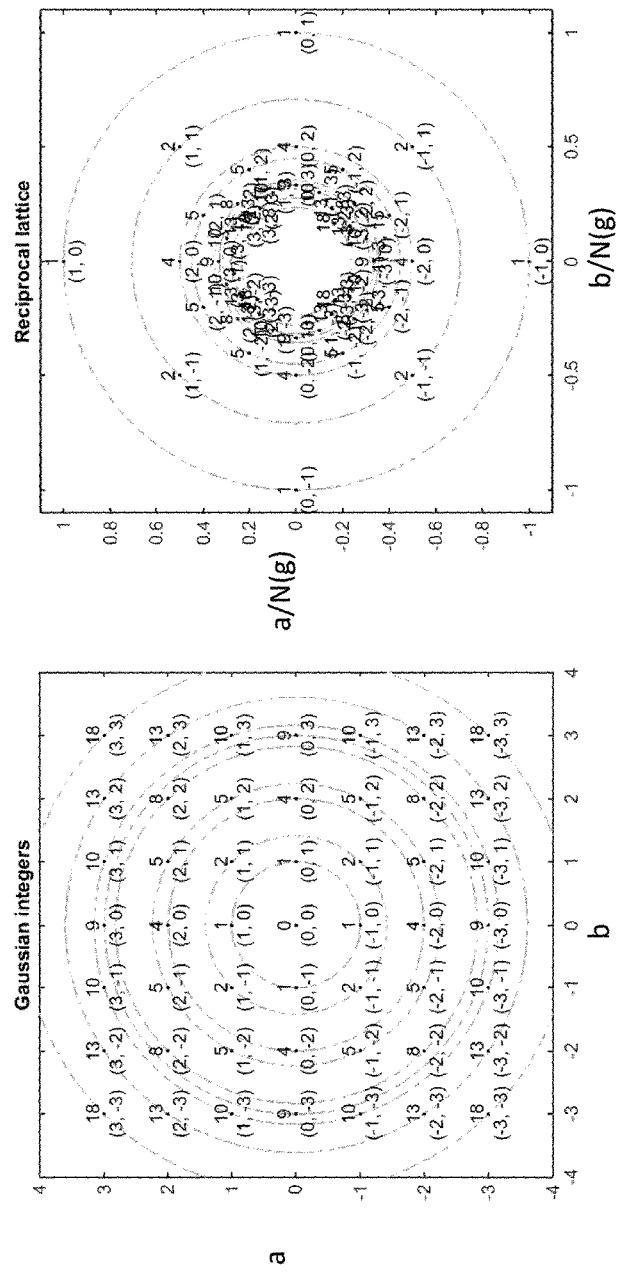
FIG. 5 is a graphical explanation for parameters used to characterize the pixel array and lens grid.

There is a graphical explanation of j and j/n as Gaussian integers and the reciprocal lattice thereof respectively shown in FIG. 5.

Each point in FIG. 5(a) is marked with the coordinate of the Gaussian integer $g=a+\mathring{\imath}b$ where $\mathring{\imath}^2=-1$ and the norm $N(g)=a^2+b^2$. FIG. 5(b) consists of the same points but the coordinates of the points are divided by their norm, thus corresponding to j/n instead of j.

Any combination $$i + \frac{j}{n}$$

from the set of solutions for j shown above is in $\mathcal{L}_{5,5}$. Two examples are $$\begin{bmatrix} 3\frac{2}{5} & 2\frac{1}{5} \end{bmatrix}^T \text{ and } \begin{bmatrix} 1\frac{4}{5} & \frac{2}{5} \end{bmatrix}^T.$$

The region $P_5$ then consists of circular regions with those centers and radius $r_5 = r_0 5^{-\gamma}$. Note that there are eight $P_5$ circles around each $P_1$ circle because there are eight solutions to $j \in \mathbb{Z}^2 \wedge \langle j,j \rangle = 5$.

In order to minimize the problems of banding for rotatable displays with pixels on an approximately square grid a display design is presented in which an array of view forming arrangements (typically a micro-lens array) forms a square grid that can be described by the direction p in terms of pixel coordinates where p is chosen outside of regions $P_n$ that give rise to banding.

To analyze the banding problem, two models have been used. The first model is based on an analysis of the spatial frequencies in both the pixel structure and the lens structure and the second one is based on ray tracing.

The first model uses moiré equations and a visibility function to estimate the amount of visible banding for a given pitch vector p.

Figure 6:
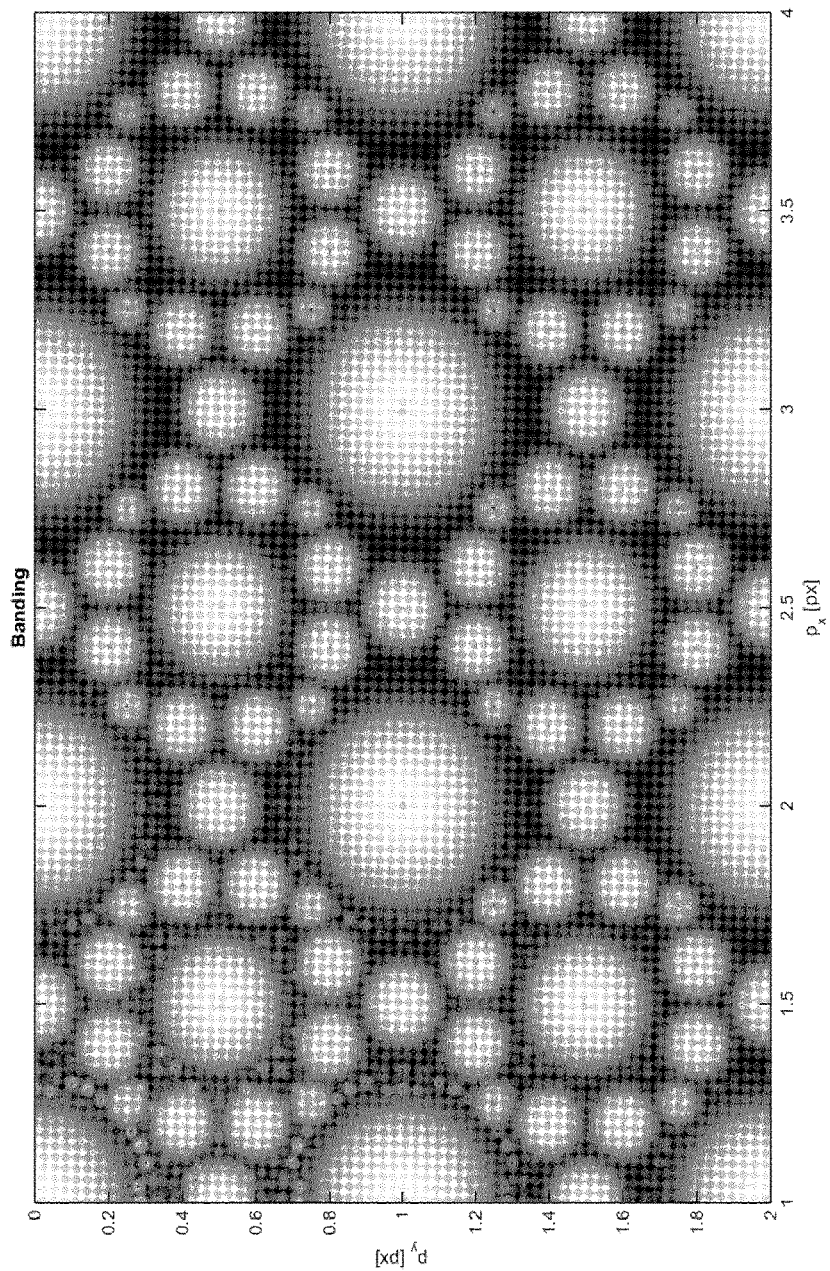
FIG. 6 shows a plot of visible banding for a given pitch vector p.

This model results in a map such as FIG. 6 where brighter areas indicate more banding (on a log scale). FIG. 6 plots the $p_y$ versus $p_x$. It should be understood that the actual map depends on parameters such as the visual angle of the microlenses and the pixel structure. The map in FIG. 6 is generated for the case of a pixel with a single emitting area with aperture ⅛ of the whole pixel surface, a Gaussian lens point spread function (PSF) that scales with the lens aperture, and a constant lens visual angle of 20 arcsec.

As a consequence of the PSF scaling more banding components are visible for smaller |p| (in the top left part of FIG. 6) because of the more accurate focus. It has been observed that the strength of various banding "blobs" depends on the actual pixel structure (see FIG. 3) but the position of the blobs is always the same.

The invention is based in part of the recognition that most of the structure in this banding map can be explained using the $P_n$ areas where $P_n$ with higher n correspond to smaller areas. Most of the areas with significant banding are explained by $P_1 \ldots P_8$.

Figure 7:
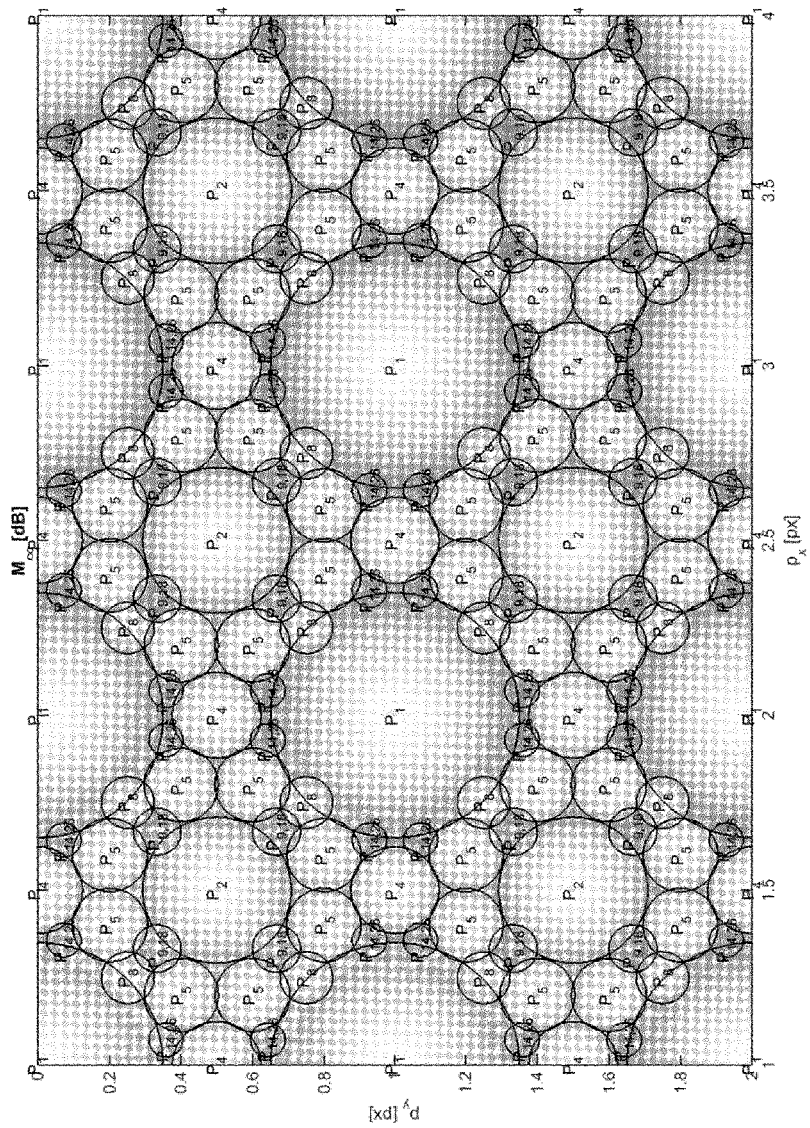
FIG. 7 shows a first possible characterization of regions from the plot of FIG. 6.
Figure 8:
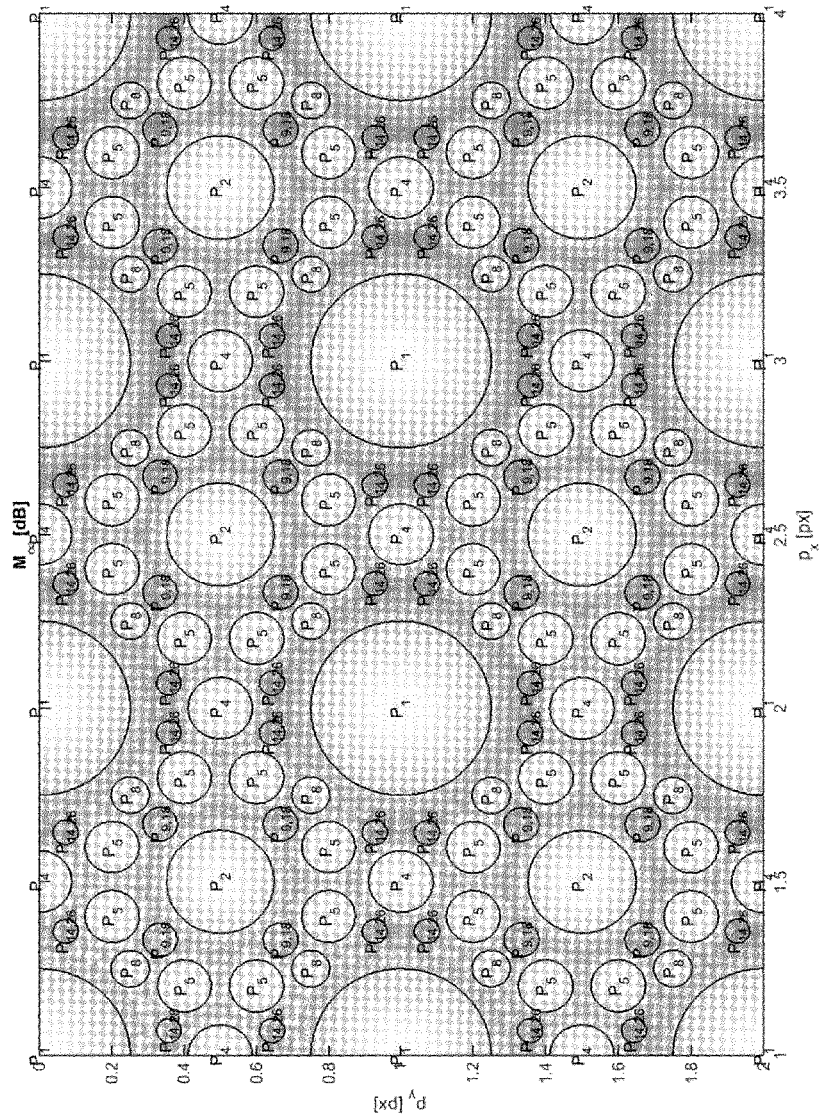
FIG. 8 shows a second possible characterization of regions from the plot of FIG. 6.

By fitting a radius $r_0 = 0.35$ and $\gamma = 0.75$ to this map, the image shown in FIG. 7 results. In other situations there might be less banding and as a consequence $r_0 = 0.25$ is sufficiently stringent. FIG. 8 shows the results of fitting a radius $r_0 = 0.25$ to the map of FIG. 5.

In FIGS. 7 and 8, preferred regions are also plotted, namely $P_{9,18}$ and $P_{14,26}$. These regions are best described by $r_0 = 0.35$.

The invention is based on avoiding the zones that give rise to banding, namely avoiding certain ranges of values of the vector $p = (p_x, p_y)$.

The first zones to avoid are the regions $P_1$ (i.e. $P_{1,1}$) which give rise to the greatest banding. In FIG. 8, with smaller radius values, the excluded zone is smaller. Thus, a first zone to exclude is based on $r_0 = 0.25$.

The zones to exclude when designing the relationship between the pixel grid and the lens grid are:
1. $p \notin P_1$ with radius $r_0 = 0.25$ and $\gamma = 0.75$,
2. As directly above and also $p \notin P_2$,
3. As directly above and also $p \notin P_4$,
4. As directly above and also $p \notin P_5$,
5. As directly above and also $p \notin P_8$,
6 Any of the above but with radius $r_0 = 0.35$.

Within the space that is left by excluding the regions, there are some regions that are of particular interest because banding is especially low for a wide range of parameters. These regions are:
1. $p \in P_{9,18}$ with radius $r_0 = 0.35$,
2. $p \in P_{14,26}$ with radius $r_0 = 0.35$.

Preferably, sub-pixels are on a square grid but small variations are possible.

The aspect ratio is preferably limited to $2/3 \leq a \leq 3/2$, or more preferably to $5/6 \leq a \leq 6/5$. The sheer of the grid from a square/rectangle to a rhombus/parallelogram is preferably to $|\theta - 90°| \leq 20°$, or even to $|\theta - 90°| \leq 5°$.

An alternative for moiré equations to illustrate the invention is to ray trace a model of a display with a lens that displays a fully white image.

Figure 9:
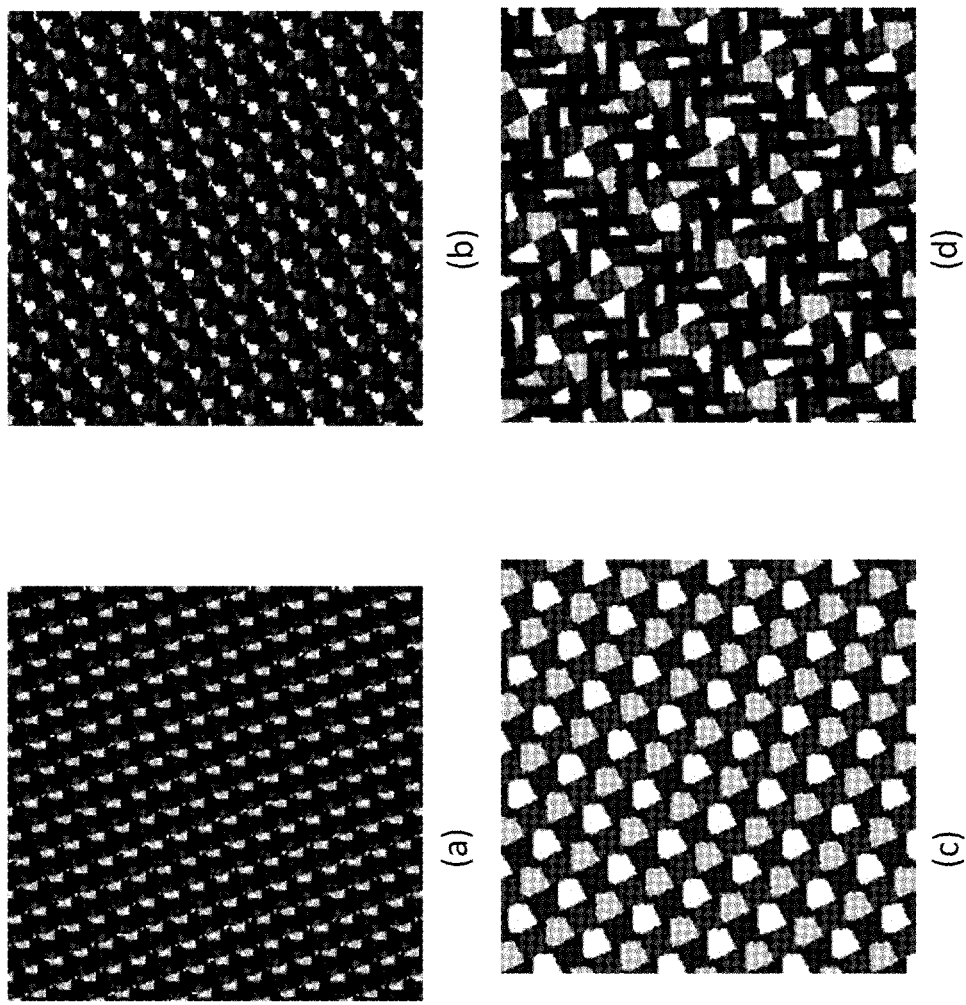
FIGS. 9a-d shows ray trace rendering simulations of the 3D pixel structure for the 2D pixel layout of FIG. 3(c) for different lens designs.

FIG. 9 shows such rendering for the 2D pixel layout as of FIG. 3(c). Any rendering of a banding-free design would appear to be on average white, while for a design with banding, the intensity and/or color depend on the viewer position (i.e. the lens phase).

FIG. 9(a) shows renderings for a lens design in a $P_1$ region for a lens phase. Although not shown in the rendition of FIG. 9(a), the white and most of the blue primary is missing. FIG. 9(b) shows renderings for a lens design in a $P_2$ region for a lens phase where more than average amount of black matrix is visible. FIG. 9(c) shows renderings for a lens design in a $P_4$ region for a lens phase where almost no black matrix is visible. FIG. 9(d) shows renderings for a lens design at a $P_{14,26}$ center with (virtually) equal distribution of primaries within this patch for this and all other phases.

A patch such as shown in FIG. 9 can be rendered for various lens phases, since different lens phases (by which is meant lens position which is responsible for generating the view to a particular viewing location) give rise to different distributions of sub-pixels. More effective is to compute the mean CIE 1931 XYZ color value for each such patch. From that mean, the CIE L*a*b* color value can be computed which gives quantitative means of comparing perceptual banding effects.

In this perceptual color space the $L_2$ distance between two color values (denoted $\Delta E$ below) is indicative of the perceived difference between those colors.

The target is white corresponding to $(L^*, a^*, b^*) = (100, 0, 0)$.

Figure 10:
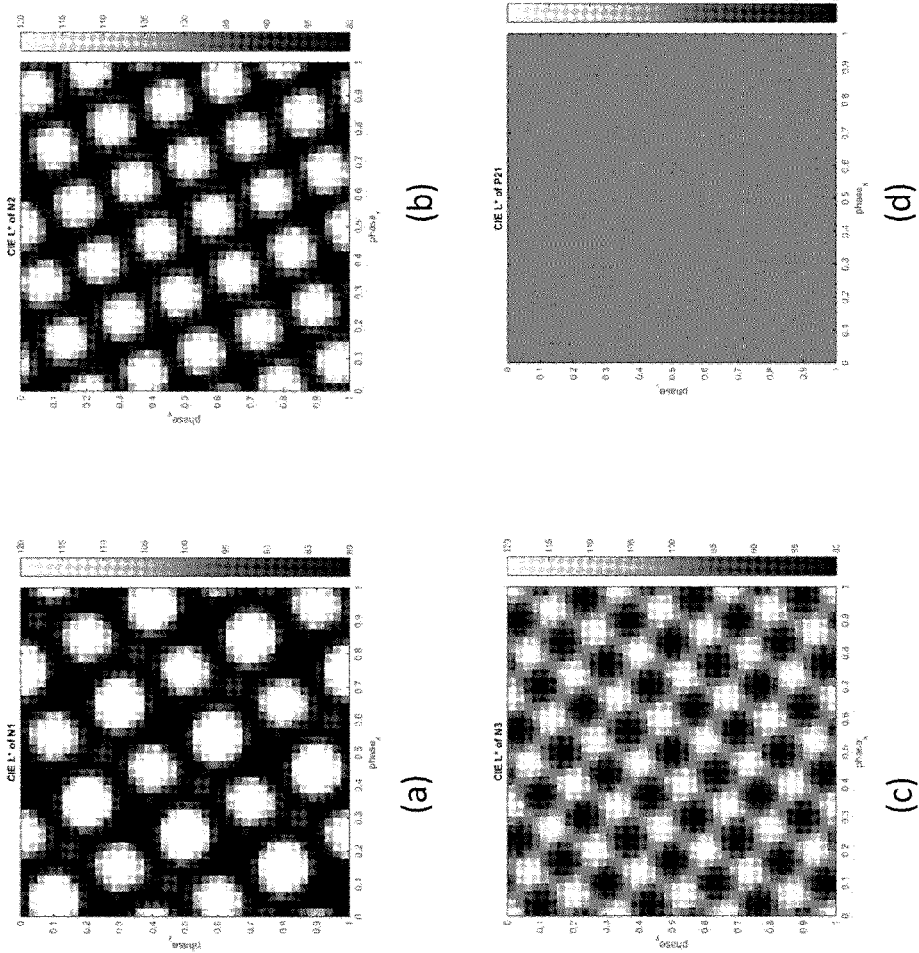
FIGS. 10a-d are a plot of the lightness (L*) as a function of the lens phases in two dimensions, for the same examples as in FIGS. 9a-d.

In FIG. 10 the lightness (L*) is plotted as a function of the lens phases in two dimensions, corresponding to different views projected by the lenses to different viewer positions, for the same examples as in FIG. 9. The dimensionless lens phase variable has values in the range of (0,1). Due to the periodicity of the pixel grid and the lens grid, lens phases 0 and 1 correspond to the same generated views. Because the display uses a 2D microlens array, the lens phase itself is also 2D.

Figure 11:
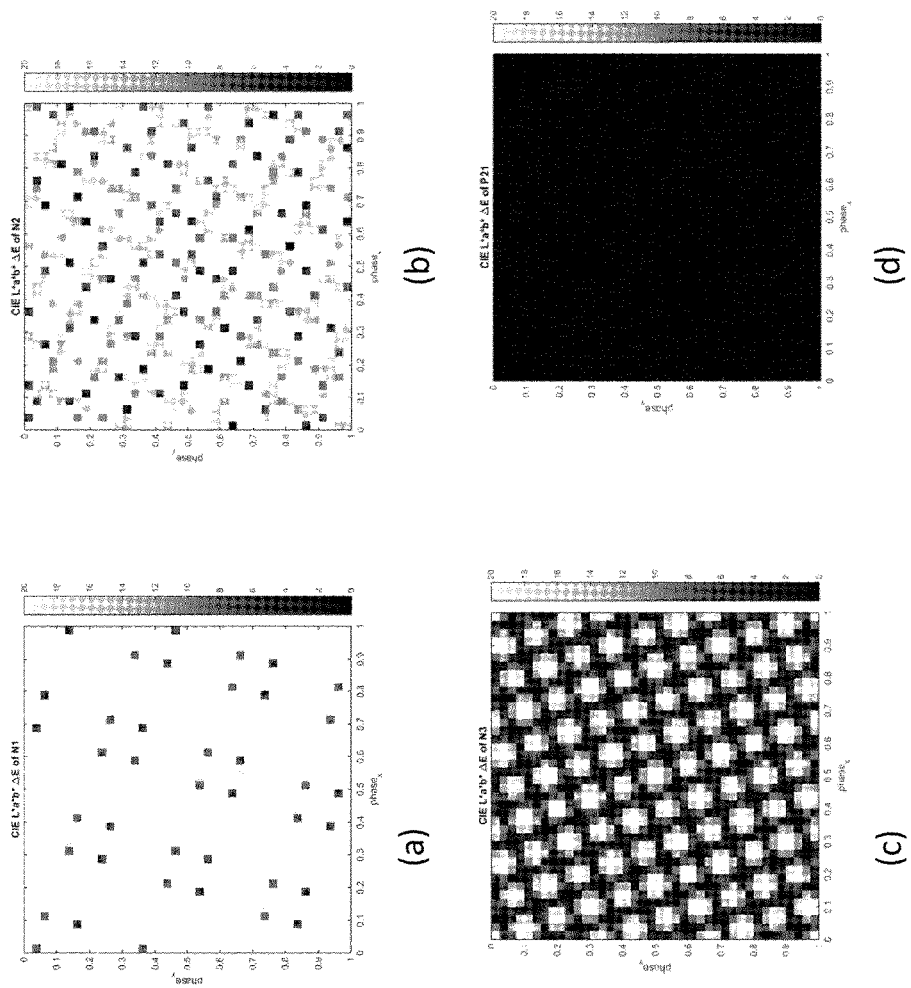
FIGS. 11a-d shows the color deviation plotted for the same examples as in FIGS. 9a-d.

In FIG. 11, the color error ($\Delta E$) is plotted again for the same examples.

Depending on the situation $\Delta E \approx 1$ is just visible. The banding-free example in FIGS. 10(d) and 11(d) appears as uniform $L^* = 100$ and $\Delta E \approx 0$ respectively, while the other examples clearly have banding as the color varies with the viewer position (i.e. lens phase).

Because the display uses a 2D microlens array, the lens phase itself is also 2D.

The plots can be summarized by taking the root-mean-square (RMS) value of $\Delta E$ over the entire phase space.

In the table below, this has been done for a list of points that correspond to regions that according to the banding model explained above should be excluded or included.

| Region | $p_x$ | $p_y$ | $\Delta E_{RMS}$ |
| --- | --- | --- | --- |
| $P_1$ | 6.000 | 2.000 | 111.576 |
| $P_2$ | 7.000 | 3.000 | 63.375 |

-continued

| Region | $p_x$ | $p_y$ | $\Delta E_{RMS}$ |
|---|---|---|---|
| $P_4$ | 6.000 | 3.000 | 12.723 |
| $P_5$ | 7.200 | 3.600 | 3.609 |
| $P_5$ | 7.600 | 3.200 | 5.738 |
| $P_8$ | 6.500 | 2.500 | 2.289 |
| $P_8$ | 4.500 | 4.500 | 1.495 |
| $P_{9,18}$ | 7.333 | 3.333 | 0.467 |
| $P_{9,18}$ | 2.600 | 2.600 | 1.308 |
| $P_{9,18}$ | 3.350 | 3.350 | 0.796 |
| $P_{9,18}$ | 3.400 | 3.400 | 0.871 |
| $P_{14,26}$ | 6.143 | 3.286 | 0.180 |
| $P_{14,26}$ | 7.286 | 2.143 | 0.185 |
| In between two $P_{14,26}$ circles | 6.000 | 3.286 | 0.155 |
| In between two $P_5$ circles | 7.000 | 3.600 | 0.611 |
| In between two $P_5$ circles | 5.000 | 3.400 | 0.289 |

From this table it is clear that the two models are largely consistent in terms of banding prediction. The positive areas have low $\Delta E_{RMS}$ values, and the biggest negative areas (with lowest ordinals) have the highest $\Delta E_{RMS}$ values.

The first model above provides an overview of the banding effect, while the second model provides more details and visualization.

The invention is applicable to the field of autostereoscopic 3D displays, more specifically to full-parallax rotatable multi-view auto-stereoscopic displays.

The invention relates to the relationship between the pixel grid and the lens grid. It can be applied to any display technology.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An autostereoscopic display, comprising:
   a pixelated display panel, the pixelated display panel comprising an array of single color pixels or an array of sub-pixels of different colors, wherein each group sub-pixels define full color pixels; and
   a view forming arrangement, wherein the view forming arrangement is positioned over the display panel,
   wherein the view forming arrangement is arranged to direct light the light from different pixels or sub-pixels to different spatial locations, thereby enabling different views of a three dimensional scene to be displayed in different spatial locations,
   wherein the pixels of the display panel form a rectangular or parallelogram grid with a maximum internal angle deviation from 90 degrees of 20 degrees or less,
   wherein the rectangular or parallelogram grid repeats with translation vectors x and y, and the length of the translation vectors x and y have an aspect ratio of the shorter to the longer between 0.66 and 1,
   wherein the view forming arrangement comprises a two dimensional array of lenses which repeat in a regular grid with translation vectors p' and q';
   wherein defining a dimensionless vector p as $(p_x, p_y)$, which satisfies:
   $$p' = p_x x + p_y y$$
   $$q' = -p_y x + p_x y$$
   and defining circular regions in the space of components of $p_y$ and $p_x$ of vector p as:
   $$P_{n,m} = \{p \mid \|p - v\| < r_{n,m} \forall v \in \mathcal{L}_{n,m}\} \text{ where}$$
   $$\mathcal{L}_{n,m} = \left\{i + \frac{j}{n} \mid i, j \in \mathbb{Z}^2 \wedge \langle j, j \rangle = m\right\}$$
   for integer values n and m,
   with $r_{n,m} = r_0 n^{-\gamma}$ defining the radius of each circle and $\mathcal{L}_{n,m}$ defining the circle centers,
   the translation vectors x, y, p' and q' are selected with values such that p falls in the vector space which excludes the set $P_{1,1}$ or $P_{2,2}$ or $P_{4,4}$ with $r_0=0.1$ and $\gamma=0.75$.

2. The autostereoscopic display as claimed in claim 1, wherein the translation vectors x, y, p' and q' have values such that p fails in vector space which excludes the set $P_{1,1}$ with $r_0=0.25$ and $\gamma=0.75$.

3. The autostereoscopic display as claimed in claim 1, wherein the translation vectors x, y, p' and q' have values such that p falls in the vector space which excludes the set $P_{2,2}$ with $r_0=0.25$ and $\gamma=0.75$.

4. The autostereoscopic display as claimed in claim 1, wherein the translation vectors x, y, p' and q' have values such that p falls in the vector space which excludes in the set $P_{4,4}$ with $r_0=0.25$ and $\gamma=0.75$.

5. The autostereoscopic display as claimed in claim 1, wherein the translation vectors x, y, p' and q' have values such that p falls in the vector space which excludes the set $P_{5,5}$ with $r_0=0.1$ and $\gamma=0.75$.

6. The autostereoscopic display as claimed in claim 5, wherein the translation vectors x, y, p' and q' have values such that p falls in the vector space which excludes the set $P_{5,5}$ with $r_0=0.25$ and $\gamma=0.75$.

7. The autostereoscopic display as claimed in claim 1, wherein the translation vectors x, y, p' and q' have values such that p falls in the vector space which excludes the set $P_{8,8}$ with $r_0=0.25$ and $\gamma=0.75$.

8. The autostereoscopic display as claimed in claim 1, wherein the translation vectors x, y, p' and q' have values such that p falls in the vector space which excludes the defined set or sets with $r_0=0.35$.

9. The autostereoscopic display as claimed in claim 1, wherein the translation vectors x, y, p' and q' have values such that p is in the set $P_{9,18}$ with $r_0=0.35$ and $\gamma=0.75$.

10. The autostereoscopic display as claimed in claim 1, wherein the translation vectors x, y, p' and q' have values such that p is in the set $P_{14,26}$ with $r_0=0.35$ and $\gamma=0.75$.

11. The autostereoscopic display as claimed in claim 1, wherein the translation vectors x and y of the pixel grid have an aspect ratio of the length of the shorter to the longer between 0.83 and 1.

12. The autostereoscopic display as claimed in claim 1, wherein the rectangle or parallelogram pixel grid has a maximum internal angle deviation from 90 degrees of 5 degrees or less.

13. A portable device comprising a display as claimed in claim 1, wherein the portable device is configurable to operate in a portrait display mode and a landscape display mode.

14. The portable device as claimed in claim 13, wherein the portable device is a mobile telephone.

15. The portable device as claimed in claim 13, wherein the portable device is a tablet.

\* \* \* \* \*